(12) United States Patent
Hari Haran et al.

(10) Patent No.: US 10,824,960 B2
(45) Date of Patent: Nov. 3, 2020

(54) SYSTEM AND METHOD FOR RECOMMENDING SEMANTICALLY SIMILAR ITEMS

(71) Applicant: TELEFONAKTIEBOLAGET LM ERICSSON (PUBL), Stockholm (SE)

(72) Inventors: Alvin Jude Hari Haran, Sunnyvale, CA (US); Julien Forgeat, San Jose, CA (US); Tong Yu, Mountain View, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 828 days.

(21) Appl. No.: 15/467,419

(22) Filed: Mar. 23, 2017

(65) Prior Publication Data

US 2018/0039910 A1 Feb. 8, 2018

Related U.S. Application Data (60) Provisional application No. 62/384,385, filed on Sep. 7, 2016, provisional application No. 62/370,155, filed on Aug. 2, 2016.

(51) Int. Cl.
*G06N 20/00* (2019.01)
*G06F 16/248* (2019.01)
*G06F 16/2457* (2019.01)
*G06F 16/36* (2019.01)
*G06N 5/02* (2006.01)

(52) U.S. Cl.
CPC .......... *G06N 20/00* (2019.01); *G06F 16/248* (2019.01); *G06F 16/24578* (2019.01); *G06F 16/36* (2019.01); *G06N 5/022* (2013.01)

(58) Field of Classification Search
CPC ........ G06N 20/00; G06N 5/022; G06F 16/36; G06F 16/24578; G06F 16/248
See application file for complete search history.

(56) References Cited

U.S. PATENT DOCUMENTS

| 6,266,649 | B1 | 7/2001 | Linden et al. | |
| 8,521,735 | B1* | 8/2013 | Mourad | G06F 16/9535 |
| | | | | 707/732 |
| 2006/0282304 | A1* | 12/2006 | Bedard | G06Q 30/0601 |
| | | | | 705/7.33 |

(Continued)

OTHER PUBLICATIONS

Li et al., "An Approach for Combining Content-based and Collaborative Filters" AsianIR '03: Proceedings of the sixth international workshop on Information retreival with Asian languages, vol. 11, pp. 17-24 (Year: 2003).*

(Continued)

*Primary Examiner* — Daniel C Puentes (57) ABSTRACT

A system and method are described herein for improving content-based (CB) filtering to find other items similar to a particular item. For example, the system and method can operate to (1) collect ground truth from users, experts or non-experts for a subset of items in a library; (2) build similarity model(s) against the collected ground truth and evaluate this/these similarity model(s) for generalizability to all items in the library, and (3) build recommendations for users based on knowledge elicited from the users themselves, combined with the similarity scores in the built similarity model(s).

20 Claims, 4 Drawing Sheets

(56) References Cited

U.S. PATENT DOCUMENTS

2012/0136812 A1    5/2012  Brdiczka
2012/0203660 A1    9/2012  Moritz et al.

OTHER PUBLICATIONS

Sarkar, et al.: "Setwise Comparison: Consistent, Scalable, Continuum Labels for Computer Vision" 2016.
Colucci, et al.: "Evaluating Item-Item Similarity Algorithms for Movies". 2016.
Sarwar, et al.: "Item-Based Collaborative Filtering Recommendation Algorithms". 2001.
Adomavicius, et al.: Toward the Next Generation of Recommender Systems: A Survey of the State-of-the-Art and Possible Extensions. 2005.
Ekstrand, et al.: "User Perception of Differences in Recommender Algorithms". 2014.
Deshpande, et al.: "Item-Based Top-N Recommendation Algorithms". 2014.
Karyps, et al.: "Evaluation of Item-Based Top-N Recommendation Algorithms." 2001.

* cited by examiner

SYSTEM AND METHOD FOR RECOMMENDING SEMANTICALLY SIMILAR ITEMS

CLAIM OF PRIORITY

This application claims the benefit of U.S. Provisional Application No. 62/370,155, filed Aug. 2, 2016. In addition, this application claims the benefit of U.S. Provisional Application No. 62/384,385, filed Sep. 7, 2016. The disclosures of these documents are hereby incorporated herein by reference for all purposes.

RELATED PATENT APPLICATION

This application is related to co-assigned U.S. application Ser. No. 15/467,362, filed on Mar. 23, 2017, and entitled "Expert-Assisted Online-Learning for Media Similarity", which claims the benefit of U.S. Provisional Application No. 62/384,385, filed Sep. 7, 2016. The disclosure of this document is hereby incorporated herein by reference for all purposes.

TECHNICAL FIELD

The present disclosure relates to a system and method for improving content-based (CB) filtering to find other items similar to a particular item. For example, the system and method operate to (1) collect ground truth from users, experts or non-experts for a subset of items in a library; (2) build similarity model(s) against the collected ground truth and evaluate this/these similarity model(s) for generalizability to all the items in the library, and (3) build recommendations for users based on knowledge elicited from the users themselves, combined with the similarity scores in the built similarity model(s).

BACKGROUND

Recommendation systems have the effect of guiding users in a personalized way to interesting objects in a large space of possible options. Two of the more common goals of recommender systems are:

Goal 1 (G1): to recommend items to users. ("You may like")

Goal 2 (G2): to find other items similar to the particular item. ("More like this")

Two of the most common methods of accomplishing these goals (G1 and G2) are:

Collaborative filtering (CF); and

Content-based filtering (CB).

Collaborative filtering (CF) is a broad category of algorithms that utilizes information of the users who consume the items. For example, if user U1 enjoys movies {M1, M2, and M3}, and user U2 enjoys movies {M1, M2, M3, and M4}, we can first infer that user U1 is similar to user U2, and that user U1 will therefore enjoy movie M4. This concept is generally referred to as "user-user" collaborative filtering (U-U-CF).

A different approach to collaborative filtering has been introduced and is referred to as "item-item collaborative filtering" (I-I CF). Here, the similarity measures on items are evaluated instead of users (e.g., if Movie M1 and M2 are both liked by users {U1, U2, U3, and U4}, but disliked by users {U8, U9}, then Movies M1 and M2 are considered to be similar). In general, U-U CF is used to accomplish G1, while I-I CF is used to accomplish G2.

Content-based (CB) recommendations use the "content" of an item to infer similarity. Content as applied to movies refers to "metadata," such as genre, cast, credits, language, ratings, etc. . . . . . This approach is good for items that have a lot of semantic or textual content. It is therefore also referred to as "semantic similarity," as similarity is judged based on semantic information rather than inferred based on user consumption as per CF.

CB is generally used to accomplish G2, as per the example above. However, the same concepts can be used to accomplish G1. For example, if a user frequently consumes movies of the genre "action" and "comedy," as there is a movie that is from the genre "action-comedy," it can be inferred that this user would be interested.

CB is most often used to correlate items, thus finding semantic similarities between them. One such method of doing this is with TF-IDF (term-frequency/inverse document frequency). TF-IDF is often used in the field of Information Retrieval. CB can be used to accomplish G1 by matching item metadata with user's profiles. For example, based on historical data of a user's consumption, it is possible to identify the fact that they watch more movies with the tag "historical", which would then allow a recommender system to recommend other movies with the same tag.

It is also possible to use CB to accomplish G2, by correlating the metadata between two items to find the semantic similarity between them. The most common way to calculate semantic similarity of two items would be to weigh each metadata and then calculate an aggregated sum. For example the similarity between two movies A and B can be calculated as such:

$$Sim(A,B)=(Weight(Genre)*Sim(Genre(A,B))+(Weight(Cast)*Sim(Cast(A,B))[\ldots]$$

Problems with Existing Solutions

CF methods rely on critical mass of information. New users will not get good recommendations until some information is known about these new users. The new users need to rate, consume, or click-through some items to allow the system to learn of the new users' preferences. This issue is referred to as the "cold-start problem." Some users need to rate about 15-20 items before the system can better learn their preferences. The same applies to items as well. Items need to have rating, consumption, or click-through data before they can be recommended. This makes it difficult for new users or new items to be surfaced in recommendations. This, in turn, creates a bubble effect, where movies that are recommended more often will "bubble" to the top, causing the movie to be rated, consumed, or clicked more, which then causes the movies to be recommended more often.

I-I CF can somewhat address the user-level cold-start problem, as all knowledge is pre-calculated. However, an evaluation of the efficacy of I-I CF to accomplish G2 demonstrated about 50% accuracy for one particular algorithm, and 7% accuracy for another. This shows that, although these methods are mathematically sound, they do not necessarily match users' perception of similarity. Plus, I-I CF still suffers from the item-level cold-start problem.

CB methods used to accomplish G1 do suffer from user-level cold start problem, but in a different way. Only one piece of knowledge of the user is needed before some information can be extracted. For example, if the user watches "Lord of the Rings," all movies that are semantically similar can be recommended.

CF methods can also be extremely resource intensive. Therefore, both I-I CF and U-U CF are usually treated as batch jobs, where they are generally run on a daily or weekly basis. As a result, knowledge about a user is generally not used until the next batch run.

CB can be used to accomplish G1, but this also requires compute power to process all tags for a user, against all tags of all items, albeit less than required by U-U CF for the same reason. It is possible to pre-compute certain values related to items, but generating recommendations per user will take some time.

In contrast, CB methods for G2 do not usually have the item-item cold-start problem. A newly added item will enjoy the same treatment as of an older movie, as long as the amount of metadata supplied is sufficient, and the model is well-built.

Using CB to accomplish G2 requires significantly less compute power, and only needs to be done in batches or every time a new item is added to the system. This creates a non-personalized of items that are similar to each other, which can be recommended to users. In addition, CB does not suffer from the item-level cold-start problem.

However, since CB to accomplish G2 generally produces a non-personalized list, the approach by itself does not allow for the building of personalized recommendations per user. In addition, the CB approach is generally built on unsupervised learning, causing the correctness of the approach to be dependent on the perception of similarity by those would build the non-personalized list. An experiment to evaluate existing techniques against user's perception showed that current CB approaches are only about 47% correct (see L. Colucci et. al. "Evaluating Item-Item Similarity Algorithms for Movies (2016)—the contents of this document are incorporated herein by reference for all purposes). Hence, there is a need to address the aforementioned problems. This need and other needs are addressed herein by the present disclosure.

SUMMARY

A system and method which address the aforementioned problems are described in the independent claims. Advantageous embodiments of the system and method are further described in the dependent claims.

In one aspect, the present disclosure provides a system which comprises a processor and a memory that stores processor-executable instructions, wherein the processor interfaces with the memory to execute the processor-executable instructions, whereby the system is operable to perform a first generate operation, a second generate operation, a third generate operation, and a return operation. In the first generate operation, the system generates a similarity matrix that indicates a plurality of similarity values for a plurality of pairs of items, wherein the plurality of similarity values are based on human rankings for a portion of the plurality of pairs of items which were been generalized by at least one model to calculate the similarity values for all of the plurality of pairs of items. In the second generate operation, the system generates a rating model that indicates correlated end-user ratings for multiple pairs of items. In the third generate operation, the system generates a list of personalized recommendations for a user indicating similar items to a single item utilizing (1) a rating for the single item from the user, (2) the similarity matrix and (3) the rating model. In the return operation, the system returns the list of personalized recommendations to the user. Some advantages of the system implementing these operations include: (1) no item-level cold star problem, (2) fast response; (3) re-uses existing information; (4) less computer resources required, and (5) able to leverage knowledge from the crowd to improve perception of similarity, either through experts or non-experts.

In another aspect, the present disclosure provides a method in a system where the method comprises a first generating step, a second generating step, a third generating step, and a returning step. In the first generating step, the system generates a similarity matrix that indicates a plurality of similarity values for a plurality of pairs of items, wherein the plurality of similarity values are based on human rankings for a portion of the plurality of pairs of items which were generalized by at least one model to calculate the similarity values for all of the plurality of pairs of items. In the second generating step, the system generates a rating model that indicates correlated end-user ratings for multiple pairs of items. In the third generating step, the system generates a list of personalized recommendations for a user indicating similar items to a single item utilizing (1) a rating for the single item from the user, (2) the similarity matrix and (3) the rating model. In the returning step, the system returns the list of personalized recommendations to the user. Some advantages of the method include: (1) no item-level cold star problem, (2) fast response; (3) re-uses existing information; (4) less computer resources required, and (5) able to leverage knowledge from the crowd to improve perception of similarity, either through experts or non-experts.

Additional aspects of the present disclosure will be set forth, in part, in the detailed description, figures and any claims which follow, and in part will be derived from the detailed description, or can be learned by practice of the disclosure. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 1:
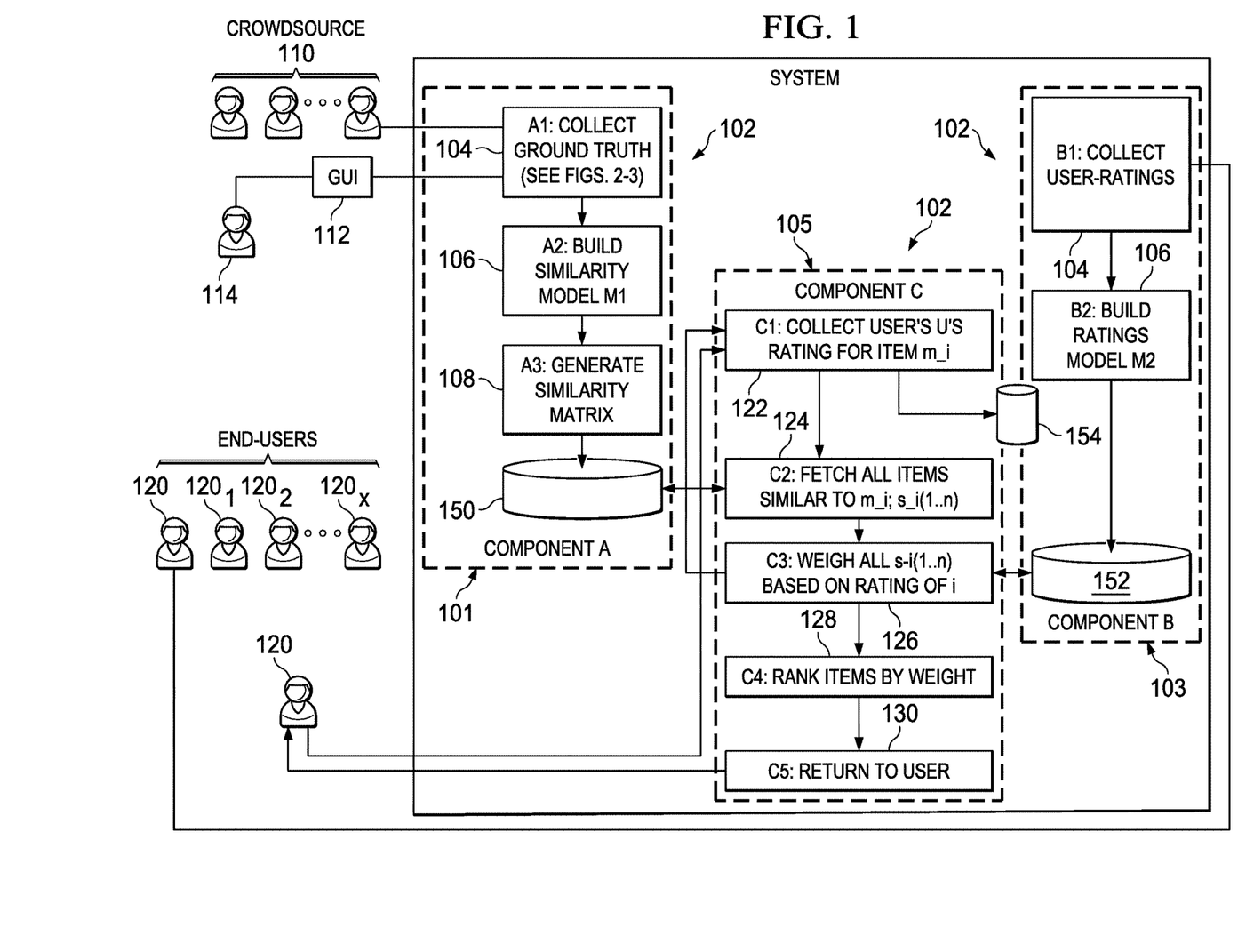
FIG. 1 is a basic diagram of a system configured to implement a method to improve CB filtering to find other items similar to a particular item in accordance with an embodiment of the present disclosure.

Referring to FIG. 1, there is shown a basic diagram of a system 100 configured to implement a method 102 to improve CB filtering to find other items similar to a particular item in accordance with an embodiment of the present disclosure. As will be discussed in detail below, the system 100 implements method 102's three main components A, B, and C to improve CB filtering to find other items similar to a particular item by improving the notion of similarity by collecting ground truth (or "consensus labeling") which allows the use of supervised learning techniques instead of unsupervised techniques in finding similar items to a particular item. The method 102's three main components A, B, and C are described in detail next.

Component A: Ground Truth

In general, component A aims to find out what makes two items similar based on pre-existing knowledge of a subset (less than the entire set) of item pairs, and then generalizes the similarity to the population of item pairs. The process described in component A which includes step 104 (A1: collect ground truth), step 106 (A2: build model M1), and step 108 (A3: generate similarity matrix) can be, for example, implemented by a collection module 101 (see also FIG. 6). The steps 104, 106 and 108 are described in detail next.

A1: Collect Ground Truth (step 104)

In step 104 (A1), the system 100 starts by collecting a corpus of ground truth, regarding item-item similarity. The purpose for doing this is to include human judgment into a subset of the library, to identify which items are similar to others. The human operators could include experts 114 or crowdsourced from non-experts 110. In either case, the data collected could be in the form $(m_i, m_j, m_{ij})$, where $m_i$ represents item i, $m_j$ represents item j and $s_{ij}$ represents the similarity score of these 2 items. It could be persisted in a data structure as such:

|<Item i>|<Item j>|<Similarity Score>|

Assuming a number of different users 110, 114 are used, all of whom could supply feedback for the same pairs, an intermediate step could be taken to first collect different opinions from different users, which will then be collated into the above. i.e. $(u_n, m_i, m_j, s_{ij})$,

|<User ID>|<Item A>|<Item B>|<Similarity Score>|

In both scenarios, the similarity score represents the human operators 110, 114's perceived similarity, and could be represented in a variety of ways. In one embodiment, a binary rating can be used in which item pairs are similar or they are not similar, and with ground-truth supplied by multiple users 110, 114. The averaged score $s_{ij}$ therefore also includes a measure or confidence. A higher score generally means more people 110, 114 think the item pair is more similar.

Alternatively input could be represented in an unary rating (e.g. similar, or unknown), ternary rating (where items are 'not similar', 'somewhat similar' and 'very similar'), or any other discreet or continuous values. For example, the binary rating, unary rating, and ternary rating can be as follows:

Binary Rating: If users 110, 114 indicate X is similar, then ifs similar; if users 110, 114 indicate X is not similar, then it is not similar. The users 110, 114 still have the option of not saying anything regarding the similarity as described herein.

Unary Rating: Labelled means it's positive (i.e., "similar"), unlabelled could be positive, negative ("not similar"), or unknown. As an example: if the user 110, 114 indicates X is positive, it's definitely positive; if the user 110, 114 does not indicate it is positive, then it could be anything. Likewise, just because X is positive does not mean the user 110, 114 will indicate that it is positive. This version of the unary rating has a positive-unlabelled meaning in that it could be positive or it could be unlabelled. There is also the option of negative/unlabelled where users 110, 114 indicate if they think X is negative (not similar).

Ternary Rating: Ternary is the starting point of a scale. For example, there can be a 3-point ternary rating scale, but it could be any number between 3 and infinity, and with even or odd number of responses. In another example, there can be a 5-point ternary scale would be: "Completely Dissimilar", "Somewhat dissimilar", "Neither Similar nor Dissimilar", "Somewhat Similar", "Very Similar". Or, the similarity question provided to the user 110, 114 could be "on a scale of 1-100, where 1 is the lowest and 100 is the highest, indicate how similar X is to Y". Hence the above statement that similarity of items can be measured in any discrete (0, 1, 2, 3, 4) or continuous (1, 1.1, 1.11111111, 2, 3, 4) scale.

In one embodiment, a graphical user interface 112 (GUI 112) is built, that allows the back-office users 114 (i.e., experts 114) to submit the similarity scores (values). For example, the system 100 may be operable to collect the corpus of ground truth from human operators 114 to obtain similarity values for the portion (subset—not all pairs of items) of the pairs of items in the library as follows (see FIGS. 2's method 200 and FIG. 3's GUI 112): receive, from the GUI 112 that is used by the human operator 114, metadata associated with a media item (see FIG. 2's step 202); use the metadata of the media item and a similarity model to find suggested similar items associated with the media item (see FIG. 2's step 204); send, to the GUI 112 to be reviewed (e.g., corrected, submitted) and possibly ranked by the human operator 114, the suggested similar items associated with the media item (see FIG. 2's step 206); receive, from the GUI 112, reviewed (e.g., corrected, submitted) and possibly ranked similar items associated with the media item (see FIG. 2's step 208); and use the reviewed (e.g., corrected, submitted) and possibly ranked similar items associated with the media item to update the similarity model with respect to the media item (see FIG. 2's step 210). In addition, the human operator 114 may provide labels when indicating the suggested similar items as being similar or dissimilar and these labels can be used to update the similarity model with respect to the media item.

Figure 3:
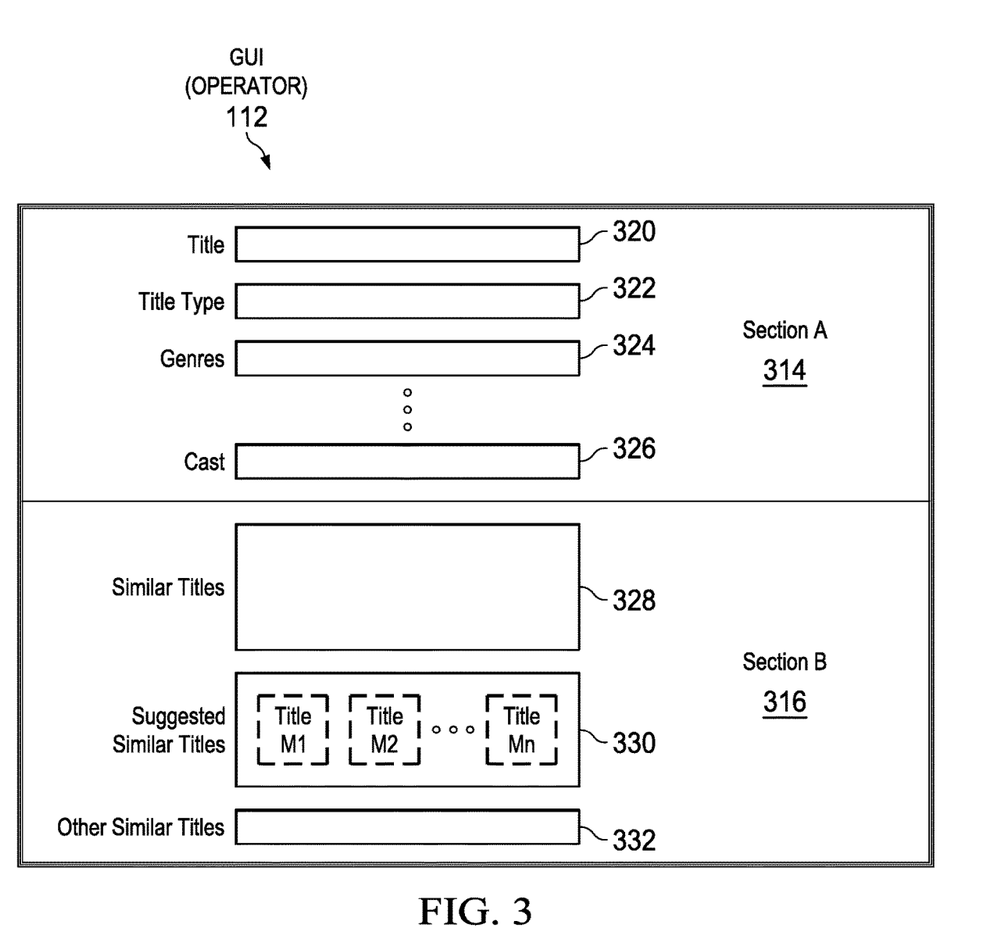
FIG. 3 is a basic diagram of an exemplary GUI (which is an interface for a human operator) that is configured in accordance with an embodiment of the present disclosure.

Referring to FIG. 3, there is illustrated a basic diagram of an exemplary GUI 112 that is configured in accordance with an embodiment of the present disclosure. The exemplary GUI 112 is built to have section A 314, and section B 316. Section A 314 is known in the art and used by the operator 114 to enter metadata such as the title, title type, genres, cast etc. . . . about an item (e.g., movie) within a title field 320, title type field 322, genres field 324, cast field 326 etc. . . . . The metadata entered here will be used by the system 100 to populate section B 316.

Section B 316 has three fields a similar titles field 328, a suggested similar titles field 330, and an other similar titles field 330. The suggested similar titles field 330 will be populated by the system 100 with suggested items Title M1, Title M2 . . . Title Mn. The suggested items Title M1, Title M2 . . . Title Mn. will be corrected and/or sorted (ranked) by the operator 114 (if necessary) as discussed in more detail below. The user 114 who actually interacts with the GUI 112 is also referred to herein as the operator 114. This operator 114 is one who is trained in the domain, whom is therefore considered an expert.

When the operator 114 enters details of a media item (movie/TV Series), the operator 114 will first perform the tasks as per usual in section A 316, adding all relevant metadata to the fields 320, 322, 324, 326 etc. . . . . . At the bottom of the form, following all other regular entries, the operator 114 is shown a list of similar items Title M1, Title M2 . . . Title Mn in the suggested similar titles field 330 of Section B 318. The operator 114 can choose to sort the suggested movies Title M1, Title M2 . . . Title Mn by their perceived similarity, or to indicate that a suggestion is incorrect. In the exemplary GUI 112, that means the operator 114 drags the suggested items {M1 . . . Mn} from their current position in the suggested similar titles field 330 to the similar titles field 328. The operator 114 can also use a freeform text field 332 shown as the other similar titles field 332 to enter their own suggestion of a similar movie, which will also be added to the similar titles field 328. The operator 114 can also sort (rank) the movies in the similar titles field 328 by perceived similarity (e.g., the rankings can be by virtue of the movies location in the similar titles field 328—the movie to the farthest left is the most relevant and the movie to the farthest right is the least relevant). The operator 114 can also directly mark any of the items in the suggested similar titles field 330 as "Not Similar". This could be done with an option icon located on the icons {M1 . . . Mn}. Any item that isn't explicitly marked as Similar or Not Similar will be considered "unknowns". This is not a preferred state, but could be allowed nonetheless. An alternative is that the front-end (or UI) could force the operator 114 to make an explicit choice if an item is similar or dissimilar. The UI could also default suggestions to True, and the operator 114 will only make explicit changes if an item is dissimilar, or unknown, and then sort the defaulted true items accordingly if required.

Figure 2:
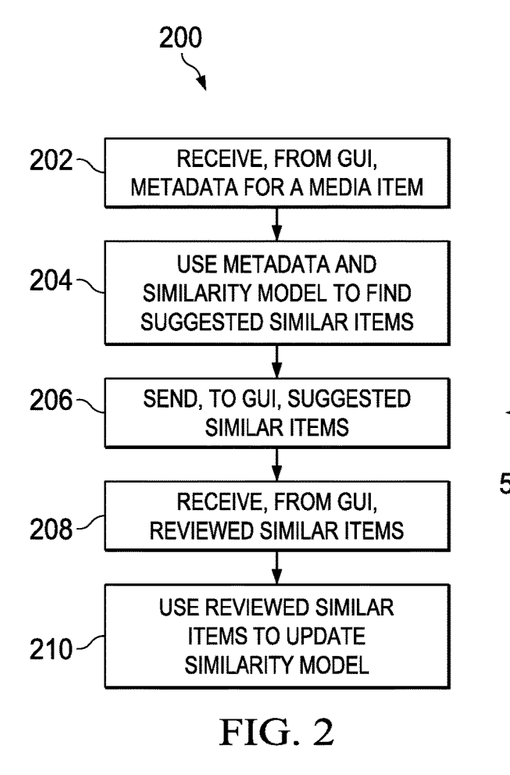
FIG. 2 is a flowchart of a method implemented by the system of FIG. 1 to collect a corpus of ground truth from a human operator in accordance with an embodiment of the present disclosure.

The system 100 will take all the input from the operator 114 into consideration in improving the algorithms (machine learning) it implements to evaluate similarity for a media item. This will allow subsequent suggestions to the operator 114 to improve over time. Some metrics that could be used to evaluate algorithms for correctness includes: precision, measured as true positives over labelled data (# TP/(# TP+# FP)), true positives over total returned (# TP/(# TP+# FP+# unlabeled)) recall (# TP/(# TP+# FN)), Mean Average Precision (MAP), Mean Average Recall (MAR), and/or Relative Mean Average Recall. Ranked measures could also be used such as Normalized Discounted Cumulative Gain (nDCG), MAP@k, MAR@k among others. The aforementioned description associated with FIGS. 2-3 is also disclosed in the co-assigned U.S. application Ser. No. 15/467,362, filed on Mar. 23, 2017, and entitled "Expert-Assisted Online-Learning for Media Similarity". The contents of this document are hereby incorporated herein by reference for all purposes.

In an alternative embodiment, the similarity scores could be collected elsewhere and exported into a compatible format, from which this system 100 will process such that, for example, the system 100 will read the similarity scores in the form $(m_i, m_j, s_{ij})$, or $(u_n, m_i, m_j, s_{ij})$.

In yet another alternative, the system 100 could use implicit signals from the end-user 110, 114, such as click-through data to be considered explicit input with regards to similarity between item pairs.

A2: Build Model M1 (Step 106)

From A1 (step 104), the system 100 has knowledge of the similarity of certain item pairs from human feedback, then the system 100 uses this knowledge in step 106 to build and evaluate a generalizable model (or models): M1. In one embodiment, three models are built and evaluated simultaneously based on linear regression, logistic regression and support vector machines (SVM). Each of the models are evaluated offline, the best parameters selected, and the best, most generalizable model M1 selected for phase A3 (step 108).

As an alternative, it is possible to build and evaluate models offline or "by hand", and model parameters that are discovered in a different system can be keyed-in manually instead of discovered in the fashion described in the aforementioned embodiment.

A3: Generate Similarity Matrix (Step 108)

The model M1 built in A2 (step 106) is then used by the system 100 to calculate the similarity between all items in the library. An exemplary similarity matrix is shown in TABLE #1:

TABLE #1

|  | $i_1$ | $i_2$ | $i_3$ | . . . | $i_n$ |
|---|---|---|---|---|---|
| $i_1$ | 1 | — | — | — | — |
| $i_2$ | .9 | 1 | — | — | — |
| $i_3$ | .04 | 0 | 1 | — | — |
| . . . | . . . | . . . | . . . | . . . | . . . |
| $i_n$ | .1 | .4 | .29 | . . . | 1 |

In one embodiment, the system 100 considers similarity to be symmetrical, whereby the similarity between item A and item B is equal in value to the similarity between item B and item A. As a result, the system 100 realistically only needs space for (n−1)×n/2 items. In TABLE #1, the similarity values are normalized such that it results in values between {0 . . . 1}. The system 100 can also consider similarity between item A and item A to be exactly 1. In another embodiment, the system 100 can use regression parameters from the linear regression model built in A2 (step 106) as weights in a TF-IDF model to generate the similarity matrix in A3 (step 108).

The similarity matrix described above is generally done in batch processes, perhaps on a weekly basis. It can also be triggered if new items are added into the library.

After all similarity calculations are done, the similarity matrix is persisted in storage 150, with an appropriate data structure similar to the aforementioned form $(m_i, m_j, s_{ij})$. The difference is that, the values for $s_{ij}$ is not based on explicit human feedback but calculated based on the model in A2 (step 106) and ground truth from A1 (step 104).

Further, it should be appreciated that the system 100 can calculate the similarity matrix in a batch process in which case a model would generalize the human rankings for a portion of the pairs of items to determine a subset (not all but less than) of the similarity values for the total amount of pairs of items in the similarity matrix. The model would perform this batch process multiple times to complete the similarity matrix.

Component B: User Ratings

The general idea for component B is to correlate users preference in regards to similar items. This idea assumes that users will enjoy the items that are similar to those they have previously enjoyed. Conversely, the users will not enjoy items similar to those they do not enjoy. Intuitively, this could mean that negatively rated items should have a negative influence, and positively rated items should have a positive factor. However, the system 100 does not make this decision blindly, but based on pre-existing data. The process described in component B which includes step 116 (B1: collect user ratings) and step 118 (B2: build ratings model) can be implemented by, for example, a correlation module 103 (see also FIG. 6). The steps 116 and 118 are described in detail next.

B1: Collect User-Ratings (Step 116)

The system 100 here collects the end-user's preference to items; an important element to personalization. In one embodiment, the end-users referred to herein in relation to component B can include the end-user 120 (associated with component C) and/or other end-users $120_1, 120_2 \ldots 120_x$ (which have been previously associated with component C). In one embodiment, the system 100 collects explicit ratings between 1 and 5, which can be explained as follows (for example) 1: Really disliked, 2: Somewhat Disliked, 3: Liked, 4: Really Liked, 5: Really Loved.

An alternative implementation, the system 100 collects explicit ratings which could be a binary like/dislike signal, or any ratings between 1 ... k.

Another alternative could be where the system 100 collects implicit signals, such as clickstreams, item browsed, item consumed, item bookmarked, or item purchased. Then, the system 100 could translate each of these implicit signals into a value between 1 ... k if required.

An alternative to eliciting ratings from users is where the user ratings are possibly obtained by the system 100 from an outside source, or even a different domain and then parsed into a file format.

B2: Build Ratings Model (Step 118)

Here, the system 100 builds a ratings model M2, which has parameters for w{1 to k}, where k is the highest rating the user can provide and w is the weight associated with the rating. The ratings model M2 exists as a parameter to weigh items higher or lower based on user preference, such that items they would enjoy is ranked higher than items they would not.

For example, the user can supply a rating between 1 to 5 stars, then the rating model M2 could return the following results shown in TABLE #2:

TABLE #2

| Rating (Stars) | Weight |
|---|---|
| 1 | −2 |
| 2 | −1 |
| 3 | 1 |
| 4 | 2 |
| 5 | 3 |

Note:
this is just an example it should be appreciated that the exact figures could be dependent on the function in the correlation module 103.

In this example, items that are similar to those that users enjoy will be eventually ranked higher, while items more similar to those that the users dislike will be weighted lower. These parameters would typically be calculated on a global level, and are therefore the parameters would not be frequently recalculated. Technically, these parameters do not need to be recalculated frequently, as they will converge over time. However, these parameters can be recalculated as frequently as the product owners want.

An option is to save a derivation of the rating model M2 per user, or per groups of users. In this case, the system 100 can start new users with the global version of the rating model M2, and relearn the personalized version of the rating model M2 over time. This scenario is useful because not all users rate items in the same way. For example, some users may give 5 stars to anything they even remotely like, while other users may save the glorious 5-stars for only a handful of items.

An alternative to the learning stage is for the system 100 to allow manual input of all parameters, based on machine-learning or model-building done outside of this system 100.

In any case, the parameters (rating model M2) are persisted in storage 152 (which can be storage 150 if desired), and the retrieved by component C when required as discussed in detail next.

Component C: Building Personalized Recommendations

The general idea for component C is to elicit some preference from the user 120, and use this knowledge, combined with knowledge from models M1 and M2 to build a list of personalized recommendations for the user 120. C1 to C4 is done for every interaction the user performs. The process described in component C which includes step 122 (C1: collect user ratings), step 124 (C2: fetch all similar items), step 126 (C3: weigh similar items by rating), step 128 (C4: rank items), and step 130 (C5: return items) can be implemented by, for example, a recommendation module 105 (see also FIG. 6). The steps 122, 124, 126, 128 and 130 are described in detail next.

C1: Collect User' Ratings (Step 122)

In one embodiment, the system 100 collects explicit signals where the user 120 rates a single item $m_i$ between 1-5 stars. These signals are persisted in storage 154 (can be storage 150 or 152). ($m_i$, $m_j$, $s_{ij}$)

Alternatively, the system 100 could collect implicit signals from the user 120. For example, the system 100 could know what the user 120 has watched, purchased or interacted with. These implicit signals could be weighted by importance. For example, the system 100 can weigh an item the user 120 purchased higher than an item which was bookmarked.

C2: Fetch all Similar Items (Step 124)

The system 100 can fetch all items similar to $m_i$ from the similarity matrix generated by M1 (see component A). For example, assume here that the system 100 received items s{1 ... 5}. Then assume that $m_1$ returns $\{s_1,s_2,s_4\}$, $m_2$ returns $\{s_2,s_5,s_3\}$, that $m_3$ returns $\{s_3,s_2,s_4,s_5,s_1\}$. The system 100 combines these results into a single data structure that can be represented as follows in TABLE #3.

TABLE #3

| | S1 | S2 | S3 | S4 | S5 |
|---|---|---|---|---|---|
| $m_1$ | 9 | 8 | 0 | 7 | 0 |
| $m_2$ | 0 | 9 | 8 | 0 | 9 |
| $m_3$ | 5 | 7 | 9 | 7 | 4 |

The similarity scores are shown above, where the system 100 used a different (alternate) similarity scoring mechanism from the embodiment described above with respect to TABLE #1. In this example, the similarity is considered between 1-10, where the higher the number is the more similar the items. In one option, it is also possible for the system 100 to set a threshold for the number of items to be retrieved, for example, the system 100 can only select the top-k items. In another option, the system 100 can set a similarity threshold, e.g. select only items where similarity score is more than 0.5. In yet another option, the system 100 can combine and use both of the above optional rules.

C3: Weigh Similar Items by Rating (Step 126)

The system 100 applies the weights from the rating model M2 (component B) to the similarity listed for example in TABLE #3. The similarity score for each similar item is accumulated as shown in TABLE #4:

TABLE 4

| | User ratings | M2 weights | S1 | S2 | S3 | S4 | S5 |
|---|---|---|---|---|---|---|---|
| $m_1$ | 1 | −2 | −18 | −16 | 0 | −14 | 0 |
| $m_2$ | 3 | 1 | 0 | 9 | 8 | 0 | 9 |
| $m_3$ | 5 | 3 | 15 | 21 | 27 | 21 | 12 |
| Total | | | −3 | 14 | 35 | 7 | 21 |

Alternatively, the accumulation can also be regularized or weighted based on the number of appearances in the similarity matrix. More specifically, the system 100 can include a regularization coefficient B, where the regularization coefficient B can be for example the number of times the similar movie appears in the matrix (TABLES #3 and #4). For example, S1 appears twice as it is similar to m1 and m3, while S2 appears 3 times since it is similar to m1, m2 and m3. Therefore, B(s1)=2 and B(s2)=3.

If the user 120 chooses to rate or interact with another item, the system 100 can start again from C1 (step 122) through this point (step 126).

C4 and C5: Rank Items (Step 128) and Return Items (Step 130)

The system 100 sorts the list by aggregated similarity, with higher scores which depict higher aggregated similarity being shown first (step 128). This sorted list is then shown (step 130) to the user 120. In the example from TABLE #4, the items shown (step 130) to the user 120 are: {S3, S5, S2, S4, S1}.

The list will naturally change as more signals are collected from this user 120. This change can be shown dynamically, or the system 110 can wait for a refresh. Alternative, the loop when user 120 rates more items can start in C4 (step 128) instead of starting in C3 (step 126).

In view of the foregoing discussion, one skilled in the art should readily appreciate that the described system 100 is specially configured to recommend personalized items to a user 120, where the recommended personalized items are semantically similar to those items the user 120 has previously consumed, interacted with, submitted ratings for etc. . . . . (e.g., basically anything that provides the aforementioned implicit or explicit feedback). For example, referring back to FIG. 1 where the system 100 has three components namely component A (collection module 101), component B (correlation module 103) and component C (recommendation module 105). In general, component A (collection module 101) addresses the background section's G2 (to find other items similar to a particular item) and then component C (recommendation module 105) uses work done by both the components A and B to address the background section's G1 (to recommend items to users). That is, the system 100 is configured to find a user 120 more items that are similar to the items that the user 120 has explicitly (or implicitly) liked, and fewer items similar to the ones that the user 120 explicitly (or implicitly) disliked. For example if the user 120 liked the movie Underworld and disliked Twilight, then Underworld 2, 3, and 4 will be weighted higher by the system 100, and Twilight 2, 3, and 4 will be weighted lower by the system 100. The system 100's components can be summarized as follows:

Component A (collection module 101) is where the system 100 collects feedback from humans such as experts or crowd sourced.

Component B (correlation module 103) is where the system 100 uses prior knowledge from users to find weights (or more accurately 'coefficients') for each rating. Assuming, the system 100 allows star-type ratings, where users can rate each item between 1-5 stars, then the system 100 would find the desired weights per rating. e.g. 1 star gets a weight of −2, 2 gets −1, 3 gets 1, 4 gets 2, and 5 gets the weight of 3 (see TABLE #2). These weights are just examples. Alternatively, the system 100 can learn these weights with offline experiments.

Component C (recommendation module 105) combines results from components A and B to (1) find items similar to the ones rated by the user 120, (2) multiply the weights defined in Component B to the similarity scores, and then (3) sum up (accumulate) all items.

The system 100 effectively address the issues discussed in the background section by: (1) collecting ground truth from users, experts or non-experts 110, 114 for a subset of the items in a library; (2) build similarity model(s) against the collected ground truth and evaluate this/these similarity model(s) for generalizability to all items in the library, and (3) build recommendations for users based on the knowledge elicited from the users themselves, combined with the scores in the built similarity model(s). There are many advantages of the system 100 some of which are as follows (for example):

No item-level cold start problem: The use of content metadata means that there is no need for an item to be rated before the item is recommended.

Fast response: The system 100 only needs knowledge of a single (preferably positive) user-item relationship. This reduces the issue with user-level cold-start problem, and allows for a more compelling demonstration to potential customers.

Reuses existing information: One infrastructure namely the system 100 can handle G2, and the information generated there could be used to address G1.

Less compute resources required: For example, the system 100 can take 2 minutes to generate a model using ground truth, 2 minutes to generate a n×n matrix of similar movies, and about 6 minutes to persist the matrix to storage. In contrast, the entire process for the traditional U-U CF can take about 2 hours.

Able to leverage knowledge from the crowd to improve perception of similarity, either through experts or non-experts 110, 114.

The system 100 builds a model for "similar movies" which are semantically similar. This is accomplished by building models against a ground truth of similar movies, thus ensuring data-driven decisions, rather than relying on blind assumptions regarding which features make two movies similar. The system 100 is not based on collaborative filtering which does not actually tell when two movies are similar but only tells when users who have watched movie A also watched movie B.

When knowledge of user-item relationship is known, the system 100 finds most similar items to be recommended. When more than one user-item relationship is known, then the system 100 discovers similar items for each of the known items and their similarity scores are summed, allowing for items that are most similar to all known items to rise to the top of a list presented to the user 120.

Example Implementations

Figure 4:
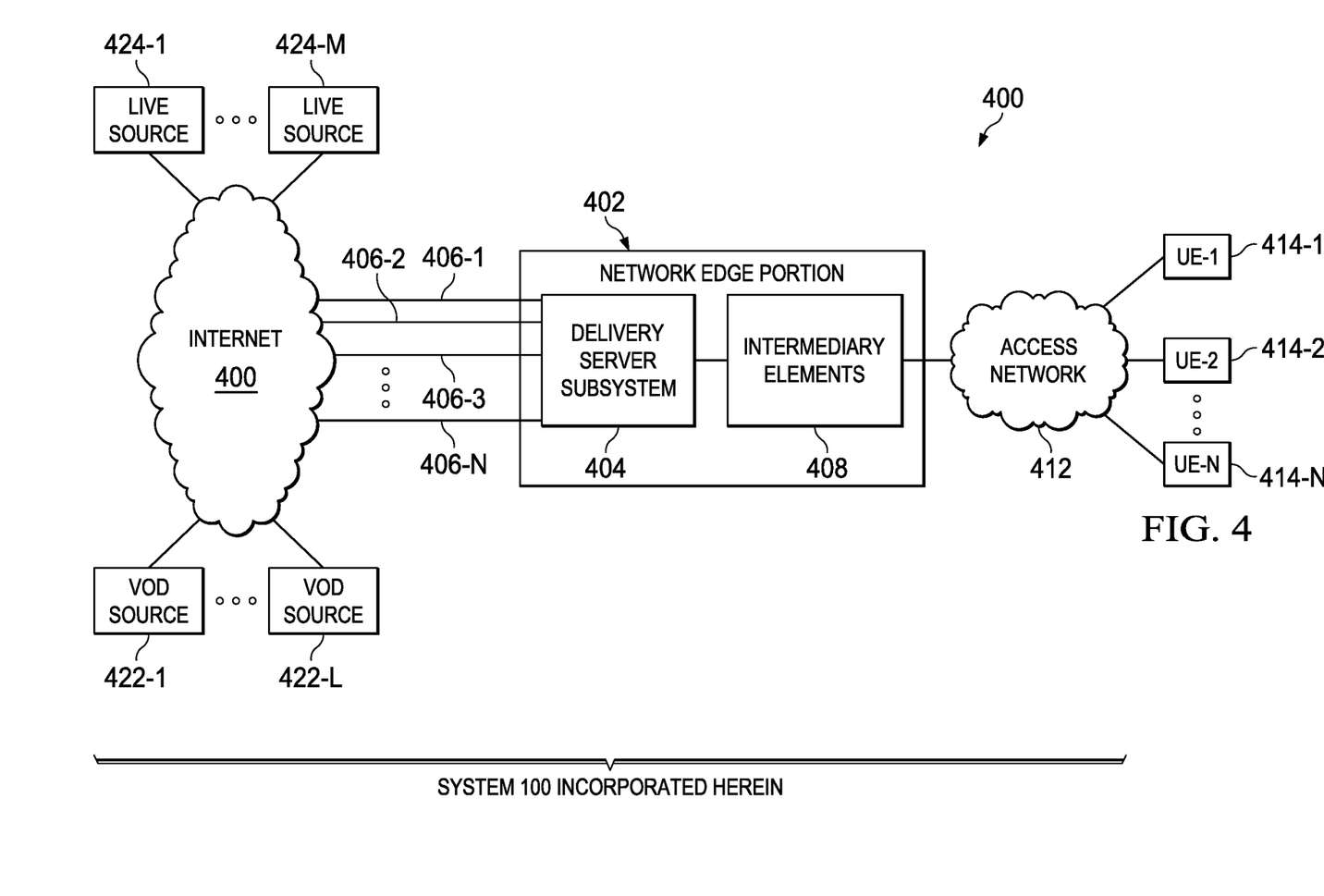
FIG. 4 is a diagram of a streaming network environment wherein one or more embodiments of the system shown in FIG. 1 may be practiced for recommending semantically similar items in a network to various users in accordance with an embodiment of the present disclosure.

FIG. 4 illustrates a generalized streaming network environment 400 wherein one or more embodiments of the system 100 may be practiced for recommending semantically similar items in a network to various users in accordance with an embodiment of the present disclosure. In general, the terms "program", "program content", "media content," "media asset" or "content file" (or terms of similar import) as used in reference to at least some embodiments of the present disclosure may include digital assets or program assets such as any type of audio/video (A/V) content that may comprise live capture media or static/stored on-demand media, e.g., over-the-air free network television (TV) shows or programs, pay TV broadcast programs via cable networks or satellite networks, free-to-air satellite TV shows, IPTV programs, Over-The-Top (OTT) and Video-On-Demand (VOD) or Movie-On-Demand (MOD) shows or programs, time-shifted TV (TSTV) content, etc., that may be delivered using any ABR technologies, including multicast, unicast, progressive download, etc. By way of illustration, a plurality of live content sources 424-1 to 424-M and a plurality of static/on-demand content sources 422-1 to 422-L are shown in the streaming network environment 400 that exemplify various such content sources, from which program content or media assets may be transmitted via a network 420 (e.g., an IP network using one or more transport layer protocols such as UDP or TCP in conjunction with an application layer protocol such as HTTP or other protocols) as segmented content streams that are encoded and/or transcoded at different bitrates (i.e., representations), to an edge network portion 402 (also sometimes referred to as "network edge") serving a plurality of user equipment (UE) devices 414-1 to 414-N via or in association with an access network 412. For example, reference numerals 406-1 to 406-N refer to a plurality of media streams (including ABR segmented VOD streams as well as ABR segmented live media streams, for instance) transmitted from such plurality of content sources. Appropriate manifest files containing metadata information describing the multiple bitrates used for encoding content at different resolutions and location pointers (e.g., Uniform Resource Locator (URL) pointers, etc.) of various segments of encoded media content are also provided to the edge network infrastructure 402 comprising an ABR delivery server subsystem 404 for effectuating streaming sessions via the access network 412. In an example implementation, the access network 412 may be comprised of a DSL network architecture, a DOCSIS-compliant Cable Modem Termination System (CMTS) network architecture, a mobile telecommunications network architecture, a CDN architecture, a metro Ethernet architecture, and/or a Fiber to the X (home/curb/premises, etc., FTTX) architecture. Accordingly, suitable intermediate elements such as routers, access multiplexers, CMTS nodes, etc., collectively shown as elements 408, may be provided in association with the network edge 402 for coupling with the access network 412. In addition, one skilled in the art will recognize that the streaming network environment 400 may be architected as a hierarchical organization wherein the various content sources and associated ABR processing systems may be disposed at different hierarchical levels of the network architecture in an illustrative implementation, e.g., super headend (SHE) nodes, regional headend (RHE) nodes, video hub office (VHO) nodes, etc. that ultimately provide the media streams to the serving edge node portion and associated access network 412 for further distribution.

Figure 5:
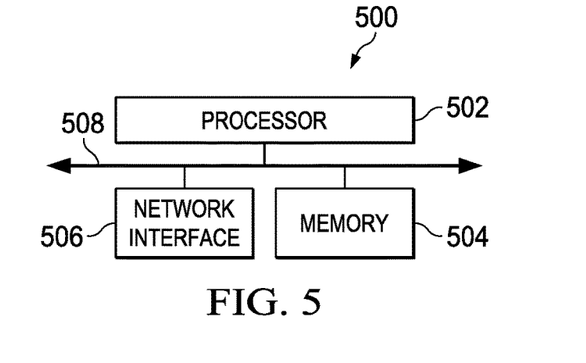
FIG. 5 is a diagram of a node that can be used to implement any of the nodes discussed in conjunction with the streaming network environment of FIG. 4 in accordance with an embodiment of the present disclosure; and, FIG. 6 is a block diagram illustrating an exemplary structure of the system configured to implement the method shown in FIG. 1 in accordance with an embodiment of the present disclosure.

FIG. 5 illustrates a node 500 that can be used to implement any of the nodes discussed in conjunction with the streaming network environment 400, including, but not limited to, the user equipment (UE) devices 414-1 to 414-N, video sources 422-1 . . . 422-L, 424-1 . . . 424M, network edges 102, and the like. As illustrated in FIG. 5, the node 500 includes at least one processor 502 and a memory 504 which are coupled to a network interface 506 via an interconnect 508. The memory 504 can be implemented by a hard disk drive, flash memory, or read-only memory and stores computer-readable instructions. The at least one processor 502 executes the computer-readable instructions and implements the functionality described above with respect to the method 102 shown in FIG. 1. The network interface 506 enables the node 500 to communicate with other nodes within the streaming network environment 400. Alternative embodiments of the present disclosure may include additional components responsible for providing additional functionality, including any functionality described above and/or any functionality necessary to support the solution described above.

Figure 6:
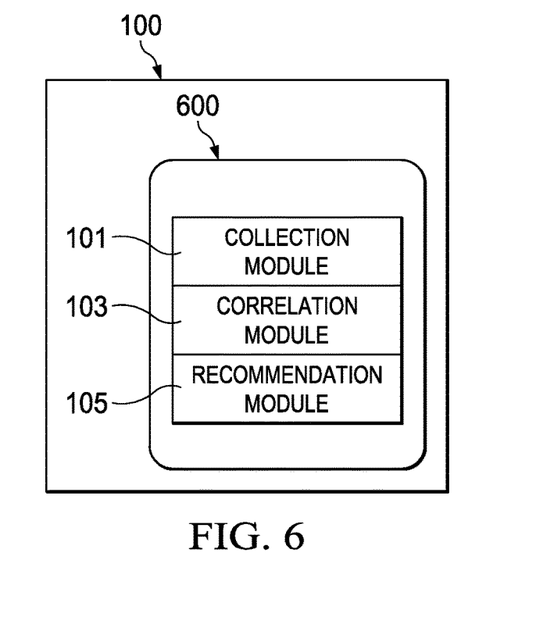

FIG. 6 is a schematic block diagram of the system 100 with functional modules. The device 100 includes a logic module 600 that further comprises the aforementioned collection module 101, the correlation module 103, and the recommendation model 105 for performing the functions described in conjunction with FIG. 1.

One skilled in the art will further recognize that various apparatuses, subsystems, functionalities/applications and/or one or more network elements as well as the underlying network infrastructures set forth above for facilitating a recording service selection scheme may be architected in a virtualized environment according to a network function virtualization (NFV) architecture in additional or alternative embodiments of the present patent disclosure. For instance, various physical resources, databases, services, applications and functions executing within an example network, e.g., network architectures described herein may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of software, e.g., ABR encoding schemes, segmentation mechanisms, media asset package databases, etc., as well as platforms and infrastructure of an ABR network may be implemented in a service-oriented architecture, e.g., Software as a Service (SaaS), Platform as a Service (PaaS), infrastructure as a Service (IaaS) etc., with multiple entities providing different features of an example embodiment of the present disclosure, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds", and the like.

In the above-description of various embodiments of the present disclosure, it is to be understood that the terminology used herein is for the purpose of describing particular embodiments only and is not intended to be limiting of the disclosure. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

The tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present disclosure may be embodied in hardware and/or in software (including firmware, resident software, microcode, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the disclosure. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the scope of the present disclosure.

The invention claimed is:

1. A system comprising:
   at least one processor; and,
   a memory that stores processor-executable instructions, wherein the at least one processor interfaces with the memory to execute the processor-executable instructions, whereby the system is operable to:
   generate (A) a similarity matrix that indicates a plurality of similarity values for a plurality of pairs of items, wherein the plurality of similarity values are based on human input indicating item-to-item similarity values for a portion of the plurality of pairs of items which were generalized by at least one model to calculate the similarity values for all of the plurality of pairs of items, wherein the portion of the plurality of pairs of items is less than all of the plurality of pairs of items;
      wherein the system is further operable to generate the similarity matrix as follows:
         collect a corpus of ground truth from at least one human operator to obtain the similarity values for the portion of the plurality of pairs of items;
         build and evaluate the at least one model; and,
         calculate the similarity matrix using the at least one model that indicates the plurality of similarity values for the plurality of pairs of items;
      wherein the system is further operable to collect the corpus of ground truth from the at least one human operator to obtain the similarity values for the portion of the plurality of pairs of items as follows:
         receive, from a graphical user interface (GUI) that is used by the at least one human operator, metadata associated with a media item;
         use the metadata of the media item and a similarity model to find suggested similar items associated with the media item;
         send, to the GUI to be reviewed by the at least one human operator, the suggested similar items associated with the media item;
         receive, from the GUI, reviewed similar items associated with the media item; and,
         use the reviewed similar items associated with the media item to update the similarity model with respect to the media item;
   generate (B) a rating model that indicates correlated end-user ratings for multiple pairs of items;
   generate (C) a list of personalized recommendations for a user indicating similar items to a single item utilizing (1) a rating for the single item from the user, (2) the similarity matrix and (3) the rating model; and,
   return (C5) the list of personalized recommendations to the user.

2. The system of claim 1, wherein the at least one human operator are at least one expert or crowdsourced from non-experts.

3. The system of claim 1, wherein the use of the reviewed similar items further comprises:
   use labels provided by the at least one human operator indicating the suggested similar items as being similar or dissimilar to update the similarity model with respect to the media item.

4. The system of claim 1, wherein the GUI is further configured to enable the at least one human operator to rank the suggested similar items when providing the reviewed similar items.

5. The system of claim 1, wherein the similarity values are one of following:
   a binary rating where each of the obtained similarity values for the portion of the plurality of pairs of items are indicated as either "similar" or "not similar";
   a unary rating where each of the obtained similarity values for the portion of the plurality of pairs of items are indicated as either "similar" or "unknown";
   a ternary rating where each of the obtained similarity values for the portion of the plurality of pairs of items are indicated as either "not similar", "somewhat similar" or "very similar"; or
   a scale between 0 to some fixed number.

6. The system of claim 1, wherein the at least one model is built and evaluated based on a machine learning technique selected from a Term Frequency-Inverse Document Frequency (TF-IDF) process, a linear regression process, a logistic regression process, a support vector machine (SVM), artificial neural networks, Bayesian belief networks, random forests, or a combination of these.

7. The system of claim 1, wherein the system is further operable to generate the rating model as follows:
   collect the end-user ratings 1 . . . k for the multiple pairs of items;
   build the rating model that indicates correlated end-user ratings for multiple pairs of items based on a combination of (1) a weight which indicates similarity between items and (2) end-user ratings 1 . . . k for each pair of items.

8. The system of claim 7, wherein the end-user ratings are one of the following:
explicit ratings between 1 . . . k; or,
implicit signals that have been translated to ratings between 1 . . . k.

9. The system of claim 1, wherein the system is further operable to generate the list of personalized recommendations for the user as follows:
collect a rating for the single item from the user;
fetch a number of items and associated similarity values from the similarity matrix that are similar to the single item;
apply weights from the rating module to the similarity values of the similar items fetched from the similarity matrix;
accumulate the weighted similarity values for each similar item; and,
rank the similar items based on the accumulated weighted similarity values of the similar items to generate the list of personalized recommendations for the user.

10. The system of claim 1, wherein the system is further operable to build and evaluate the at least one model as follows:
build three models including one model based on linear regression, another model based on logistic regression, and yet another model based on support vector machines, and then evaluate the three models to select a most generalizable model to use as the at least one model.

11. A method in a system, the method comprising:
generating (A) a similarity matrix that indicates a plurality of similarity values for a plurality of pairs of items, wherein the plurality of similarity values are based on human input indicating item-to-item similarity values for a portion of the plurality of pairs of items which were generalized by at least one model to calculate the similarity values for all of the plurality of pairs of items, wherein the portion of the plurality of pairs of items is less than all of the plurality of pairs of items;
wherein the step of generating the similarity matrix further comprises:
collecting a corpus of ground truth from at least one human operator to obtain the similarity values for the portion of the plurality of pairs of items;
building and evaluating the at least one model; and,
calculating the similarity matrix using the at least one model that indicates the plurality of similarity values for the plurality of pairs of items;
wherein the step of collecting the corpus of ground truth from the at least one human operator to obtain the similarity values for the portion of the plurality of pairs of items further comprises:
receiving, from a graphical user interface (GUI) that is used by the at least one human operator, metadata associated with a media item;
using the metadata of the media item and a similarity model to find suggested similar items associated with the media item;
sending, to the GUI to be reviewed by the at least one human operator, the suggested similar items associated with the media item;
receiving, from the GUI, reviewed similar items associated with the media item; and,
using the reviewed similar items associated with the media item to update the similarity model with respect to the media item;
generating (B) a rating model that indicates correlated end-user ratings for multiple pairs of items;
generating (C) a list of personalized recommendations for a user indicating similar items to a single item utilizing (1) a rating for the single item from the user, (2) the similarity matrix and (3) the rating model; and,
returning (C5) the list of personalized recommendations to the user.

12. The method of claim 11, wherein the at least one human operator are at least one expert or crowdsourced from non-experts.

13. The method of claim 11, wherein the step of using the reviewed similar items further comprises:
using labels provided by the at least one human operator indicating the suggested similar items as being similar or dissimilar to update the similarity model with respect to the media item.

14. The method of claim 11, wherein the GUI is further configured to enable the at least one human operator to rank the suggested similar items when providing the reviewed similar items.

15. The method of claim 11, wherein the similarity values are one of following:
a binary rating where each of the obtained similarity values for the portion of the plurality of pairs of items are indicated as either "similar" or "not similar";
a unary rating where each of the obtained similarity values for the portion of the plurality of pairs of items are indicated as either "similar" or "unknown";
a ternary rating where the each of the obtained similarity values for the portion of the plurality of pairs of items are indicated as either "not similar", "somewhat similar" or "very similar"; or
a scale between 0 to some fixed number.

16. The method of claim 11, wherein the at least one model is built and evaluated based on a machine learning technique selected from a Term Frequency-Inverse Document Frequency (TF-IDF) process, a linear regression process, a logistic regression process, a support vector machine (SVM), artificial neural networks, Bayesian belief networks, random forests, or a combination of these.

17. The method of claim 11, wherein the step of generating the rating model further comprises:
collecting the end-user ratings 1 . . . k for the multiple pairs of items;
building the rating model that indicates correlated end-user ratings for multiple pairs of items based on a combination of (1) a weight which indicates similarity between items and (2) end-user ratings 1 . . . k for each pair of items.

18. The method of claim 17, wherein the end-user ratings are one of the following:
explicit ratings between 1 . . . k; or,
implicit signals that have been translated to ratings between 1 . . . k.

19. The method of claim 11, wherein the step of generating the list of personalized recommendations for the user further comprises:
collecting a rating for the single item from the user;
fetching a number of items and associated similarity values from the similarity matrix that are similar to the single item;
applying weights from the rating module to the similarity values of the similar items fetched from the similarity matrix;
accumulating the weighted similarity values for each similar item; and, ranking the similar items based on the accumulated weighted similarity values of the similar items to generate the list of personalized recommendations for the user.

20. The method of claim 11, wherein the step of building and evaluating the at least one model further comprises:

building three models including one model based on linear regression, another model based on logistic regression, and yet another model based on support vector machines, and then evaluating the three models to select a most generalizable model to use as the at least one model.

\* \* \* \* \*